United States Patent Office 2,770,562
Patented Nov. 13, 1956

2,770,562

METHOD OF PRODUCING NON-CRYSTAL-LIZING HYDROL

Walter R. Fetzer, Clinton, Iowa, assignor, by mesne assignments, to Standard Brands Incorporated, New York, N. Y., a corporation of Delaware No Drawing. Application May 3, 1954,
Serial No. 427,348

4 Claims. (Cl. 127—34)

This invention relates to the manufacture of a non-crystallizing syrup from hydrol.

Hydrol, sometimes called corn sugar molasses, is the final mother liquor or residual liquor remaining from the manufacture of crystalline dextrose.

The usual commercial manufacture of crystalline dextrose involves initially subjecting a water slurry of raw corn starch to hydrolysis by means of heat and an acid such as hydrochloric acid. The reaction is allowed to continue until the starch has been hydrolyzed to produce a liquor of about 90–93 D. E., containing about 85 to 90% of dextrose, measured on a dry basis, together with other sugars.

When it is hydrolyzed as far as desired, the liquor is refined and evaporated down to a density of about 38 Baumé to 40 Baumé, according to current practices, after which it is then cooled and seeded with crystallized dextrose and allowed to develop crystals in a water-jacketed crystallizer, subject to continuous slow agitation. The dextrose crystals are subsequently centrifugally separated from the liquor.

This mother liquor, known as first greens in the current conventional practice, is subsequently rehydrolyzed, refined, and concentrated. This syrup, now known as second sugar syrup, is recrystallized in a manner similar to first sugar syrup and the resulting dextrose centrifugally separated. The mother liquor, from this second crystallization, is concentrated to 40–42° Baumé. This syrup is known as "hydrol." The final temperature of the second sugar crystallization customarily ranges between 60 and 65° F. When the syrup is concentrated to 42° Baumé, the potential for further crystallization is increased. Since the hydrol in shipment and storage may be subjected to lower than 60–65° F. temperatures, the potential for further crystallization is greatly increased. This potential crystallization of hydrol mitigates against its sales and usefulness as compared with the competing, low-priced, residual cane sugar syrup—blackstrap molasses—which does not crystallize.

Hydrol has various commercial uses. Among them is its use as a substrate in fermentation processes. It is also often shipped to commercial feed mixers who add it as a high density liquid to granular cattle feeds, which mixtures may be further dehydrated before use. To meet this and other demands, the hydrol must be shipped and stored as a free-flowing syrup. However, because of its high percentage of dextrose and the steep solubility curve of dextrose, the hydrol has a strong tendency to develop crystal masses when subject to room temperature or lower. Any substantial growth of crystals will sink to the bottom of the storage tank and interfere with the draining of the tank.

It has sometimes been the practice to maintain the hydrol subject to an elevated temperature to inhibit crystal growth. This procedure is expensive and not always possible. Partially crystallized syrup also has been reheated to dissolve the crystals and render the syrup free-flowing. This procedure is most unsatisfactory for the applied heat rarely reaches valves and pipe lines in which the crystalline dextrose may be thoroughly lodged. Further, it has been found that once seed is present in crevices or corners of a vessel, crystallization proceeds at an accelerated rate when the heat application is withdrawn. Addition agents, such as pasted starch and dextrin, have been used. These are effective in large amounts, but the cost is uneconomic and these materials are unsuitable in some uses of hydrol. The industry has long sought to find a low-cost method of inhibiting or retarding the crystallization of hydrol which would not decrease the value of the product in its intended use by a destruction of its reducing sugar or by an increased ash content.

It is the object of this invention to subject conventional hydrol to a treatment which will so alter it as to render it non crystallizing under temperature conditions which it ordinarily may be expected to encounter.

The invention involves briefly subjecting the hydrol to treatment by heat and a small amount of ammonia, until the hydrol has been modified to become non-crystallizing, and then terminating the reaction by cooling it to ambient temperatures, or at least sufficiently to stop the reaction. No further treatment is required.

In practicing the invention, the hydrol preferably will be treated while at the aforementioned densities, in the range of 40 to 42 Bé., for reasons of economy in handling, although the treatment may be conducted effectively at other densities, higher or lower.

The amount of ammonia employed preferably will be about 0.5% to 1.0% of the dry basis weight of the hydrol, although slightly greater or lesser percentages of ammonia may be used effectively, depending upon the efficiency of the removal of the dextrose in the second sugar crystallization and the expected shipping and storage conditions to be encountered.

The temperature of the hydrol at atmospheric pressure during the ammoniation reaction may be within the range of 160° F. to about 230° F., its boiling point at atmospheric pressure. If the hydrol be under pressure, it will be satisfactory to have the temperature higher than 230° F., and under such conditions the time of treatment may be shortened as the reaction proceeds more rapidly at increased temperatures.

In the process I may use anhydrous ammonia, or its salts such as ammonium carbonate, ammonium bicarbonate, ammonium phosphate, ammonium sulphate, and ammonium chloride, either singly or in combinations. Where the term "ammonia" is used in this patent specification and claims, the above listed salts are to be considered the equivalent.

The users of hydrol are primarily interested in the relatively high sugar content it has, compared with other sugar-containing by-products. Hence, in the practice of this invention one should avoid unnecessary reduction of the sugar content, which I have found can be avoided by proper correlation of the factors of time of treatment, temperature of treatment, and amount of ammonia employed.

It is therefore recommended that these factors be so correlated that the treatment be terminated when it has proceeded far enough to render the hydrol non-crystallizing at the temperatures it may encounter during storage and transportation. As explained hereinafter, 0.5% to 1.0% of ammonia appears to yield the desired results, and for reasons of economy the amount of ammonia may well be limited to such amounts. It will also be noted that the reduction in D. E. resulting from the treatment rarely needs to exceed 5, which is in general very desirable.

In the succeeding examples, the data show treatment of hydrol with ammonia salts in several amounts at the same temperature, but for different time periods. The products treated with 0.25% ammonia were not sufficiently non-crystallizing, but the others were sufficiently treated as to be satisfactorily non-crystallizing for anticipated commercial conditions. Treatment with a higher percentage of ammonia, for example 2%, under similar conditions, rendered the product non-crystallizing, but showed unnecessary diminution of the D. E., which means, reducing sugars calculated as dextrose and expressed on a dry substance basis. From numerous experiments it is concluded that treatment within a range of about 160° F. to 230° F., for 10 to 20 minutes, with 0.5 to 1.0% of ammonia, will give the desired and avoid the undesired results.

EXAMPLE I

*Ammoniated hydrol*

| | Hydrol | Calculated as Ammonia—Solids Basis | | |
|---|---|---|---|---|
| | | .025% | 0.50% | 1.00% |
| Ammonium Carbonate | | 0.83 | 1.67 | 3.33 |
| pH of Initial Hydrol | 4.4 | 4.4 | 4.4 | 4.4 |
| Time for Ammonia Addition | | 1′ | 2′ | 5′ |
| Temperature of Hydrol | | 200° F | 200° F | 200° F |
| Elapsed Heating Time | | 30′ | 30′ | 30′ |
| pH of Ammoniated Syrup | | 5.95 | 6.35 | 6.80 |
| Calculated Protein Equivalent N × 6.25—DB | 0.3 | 1.3 | 2.6 | 5.2 |
| Dry Substance | 73.5 | 73.5 | 73.2 | 72.8 |
| DE | 73.3 | 72.1 | 71.0 | 68.2 |
| Inhibition of Crystallization | None | Unsatisfactory | Satisfactory | Satisfactory |

EXAMPLE II

*Ammoniated hydrol*

| | Hydrol | Calculated as Ammonia—Solids Basis | | |
|---|---|---|---|---|
| | | 0.25% | 0.5% | 1.0% |
| Ammonium Phosphate Dibasic | | 0.97 | 1.94 | 3.88 |
| pH of Initial Hydrol | 4.4 | 4.4 | 4.4 | 4.4 |
| Time for Ammonia Addition | | 1′ | 1′ | 3′ |
| Temperature of Hydrol | | 230° F | 230° F | 230° F |
| Elapsed Heating Time | | 20′ | 10′ | 15′ |
| pH of Ammoniated Syrup | | 4.80 | 4.7 | 4.25 |
| Calculated Protein Equivalent N × 6.25—DB | 0.3 | 1.3 | 2.6 | 5.2 |
| Dry Substance | 74.3 | 73.9 | 73.5 | 72.6 |
| DE | 73.2 | 73.3 | 72.6 | 67.8 |
| Inhibition of Crystallization | None | Unsatisfactory | Satisfactory | Satisfactory |

It is not presently known why this mild treatment of hydrol renders it non-crystallizing. The changes in its analysis resulting from the treatment do not appear to reveal the reason. It is understood that ammonia reacts readily with the aldehyde sugars at elevated temperatures. But the observed change in D. E. is not large enough to suggest an explanation of the change in crystallizing tendency of the treated hydrol. Suffice it to say that the ammonia reaction with these sugars in a hydrol is partly understood and partly a matter of speculation. But the effect on crystallizing tendency of the treated hydrol, while not understood, is definitely established by observation.

As said above, the production of a non-crystallizing hydrol is the main objective. In most instances the final D. E. should be retained as high as possible. Where this latter consideration is not deemed so important, a more extensive treatment may be employed, and all such variations as have been mentioned above are intended to be covered by the appended claims.

Having described my invention, I claim:

1. A method of rendering corn sugar hydrol non-crystallizing comprising heating the hydrol to a temperature between 160° and 230° F. and admixing it with ammonia in such an amount that the ammonia constitutes between 0.5% and 1.0% of the dry basis weight of the hydrol, continuing the reaction under the heat treatment for at least 10 minutes and terminating the reaction by cooling of the mixture to limit the reaction to not more than 30 minutes.

2. A method of rendering corn sugar hydrol non-crystallizing comprising heating the hydrol to a temperature between 160° and 230° F. and adding ammonia to the hydrol in the amount of 0.5% to 1.0% of the dry basis weight of the hydrol, continuing the reaction until the D. E. has been reduced a measurable amount but not more than 10 points and the product rendered non-crystallizing, and cooling the hydrol.

3. A method of treating corn sugar hydrol to render it non-crystallizing comprising treating the hydrol by the addition of ammonia in the proportion of about 0.5 to 1.0% of the dry basis weight of the hydrol, and heating the hydrol to a temperature between 160° and 230° F., continuing the reaction until the D. E. has been reduced a measurable amount but not more than 10 points and the product rendered non-crystallizing and terminating the ammonia reaction on the hydrol by cooling, the ammonia utilized being selected from the group consisting of anhydrous ammonia, ammonium carbonate, ammonium bicarbonate, ammonium phosphate, ammonium sulphate and ammonium chloride.

4. A method of treating corn sugar hydrol to render it non-crystallizing comprising reducing its D. E. by treating the hydrol by the addition of ammonia in the proportion of about 0.5% of the dry basis weight of the hydrol and heating the hydrol to a temperature between 160° F. and 230° F. for about 10 to 30 minutes, and terminating the heating treatment by cooling the hydrol sufficiently to stop the reaction so as to avoid reduction of the D. E. by more than about 10 points.

References Cited in the file of this patent

UNITED STATES PATENTS

| 710,413 | Besson | Oct. 7, 1902 |
| 1,031,602 | Wechsler | July 2, 1912 |

FOREIGN PATENTS

| 20,166 | Great Britain | of 1904 |